United States Patent
Wang et al.

(10) Patent No.: US 9,507,617 B1
(45) Date of Patent: Nov. 29, 2016

(54) INTER-VIRTUAL MACHINE COMMUNICATION USING PSEUDO DEVICES

(71) Applicant: Trend Micro Incorporated, Tokyo (JP)

(72) Inventors: Hsiao-Peng Wang, Taipei (TW); Wen-Chien Weng, Taipei (TW); Ching-Yi Li, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 304 days.

(21) Appl. No.: 14/094,364

(22) Filed: Dec. 2, 2013

(51) Int. Cl.
*G06F 9/455* (2006.01)

(52) U.S. Cl.
CPC ......... *G06F 9/4555* (2013.01); *G06F 9/45558* (2013.01)

(58) Field of Classification Search
CPC .................. G06F 9/45558; G06F 2009/45591; G06F 9/45541; G06F 9/4555
USPC ........................................................ 718/1
See application file for complete search history.

(56) References Cited

U.S. PATENT DOCUMENTS

| | | | |
|---|---|---|---|
| 6,091,412 A | 7/2000 | Simonoff et al. | |
| 6,356,931 B2 | 3/2002 | Isamel et al. | |
| 6,401,134 B1 | 6/2002 | Razavi et al. | |
| 6,433,794 B1 | 8/2002 | Beadle et al. | |
| 6,492,995 B1 | 12/2002 | Atkin et al. | |
| 6,647,544 B1 | 11/2003 | Ryman et al. | |
| 6,757,895 B1 | 6/2004 | Beadle et al. | |
| 6,799,195 B1 | 9/2004 | Thibault et al. | |
| 6,842,777 B1 | 1/2005 | Tuli | |
| 6,842,897 B1 | 1/2005 | Beadle et al. | |
| 6,941,552 B1 | 9/2005 | Beadle et al. | |
| 6,976,059 B1 | 12/2005 | Rogalski et al. | |
| 7,039,691 B1 | 5/2006 | Turnidge | |
| 7,191,211 B2 | 3/2007 | Tuli | |
| 7,290,129 B2 | 10/2007 | Chebolu et al. | |

(Continued)

FOREIGN PATENT DOCUMENTS

| EP | 1 316 873 | 4/2003 |
|---|---|---|
| EP | 1 377 892 | 9/2004 |

(Continued)

OTHER PUBLICATIONS

Hadeel Tariq Al-Rayes "Studying Main Differences between Android & Linux Operating Systems", Oct. 2012, pp. 46-49, vol. 12, No. 5, International Journal of Electrical & Computer Sciences IJECS-IJENS.

(Continued)

*Primary Examiner* — Meng An
*Assistant Examiner* — Willy W Huaracha
(74) *Attorney, Agent, or Firm* — Okamoto & Benedicto LLP

(57) ABSTRACT

Communication between software components in different virtual machines may be made through a hypervisor between pseudo-devices that have no corresponding physical device. A software component in a virtual machine transfers data to a pseudo-device in the virtual machine. The pseudo-device is connected to another pseudo-device in another virtual machine, and the connection is through the hypervisor. The data from the software component is transferred from the pseudo-device to the other pseudo-device over the connection through the hypervisor. The other pseudo-device in the other virtual machine receives the data and provides the data to another software component in the other virtual machine.

11 Claims, 7 Drawing Sheets

(56) References Cited

U.S. PATENT DOCUMENTS

| | | | |
|---|---|---|---|
| 7,346,909 B1* | 3/2008 | Eldar | H04L 29/12924 709/202 |
| 7,506,257 B1 | 3/2009 | Chavez et al. | |
| 7,634,811 B1 | 12/2009 | Kienzle et al. | |
| 7,735,138 B2 | 6/2010 | Zhao | |
| 7,757,231 B2* | 7/2010 | Anderson | G06F 9/45533 718/1 |
| 7,779,424 B2* | 8/2010 | Cherkasova | G06F 11/3423 709/223 |
| 7,865,893 B1* | 1/2011 | Omelyanchuk | G06F 11/3644 710/1 |
| 8,023,974 B1 | 9/2011 | Diao et al. | |
| 8,024,790 B2 | 9/2011 | Zhao et al. | |
| 8,104,083 B1* | 1/2012 | Sobel | G06F 9/45558 726/17 |
| 8,239,918 B1 | 8/2012 | Cohen | |
| 8,739,156 B2* | 5/2014 | Frank | G06F 9/45537 718/1 |
| 8,826,273 B1* | 9/2014 | Chen | G06F 9/45558 718/1 |
| 2001/0054062 A1 | 12/2001 | Ismael et al. | |
| 2002/0129281 A1 | 9/2002 | Hatfalvi et al. | |
| 2003/0041106 A1 | 2/2003 | Tuli | |
| 2004/0148608 A1 | 7/2004 | Gendreau et al. | |
| 2004/0158830 A1 | 8/2004 | Chung et al. | |
| 2004/0230643 A1 | 11/2004 | Thibault et al. | |
| 2005/0188361 A1 | 8/2005 | Cai et al. | |
| 2005/0198485 A1 | 9/2005 | Nguyen et al. | |
| 2005/0246176 A1 | 11/2005 | Creamer et al. | |
| 2006/0112342 A1 | 5/2006 | Bantz et al. | |
| 2007/0079244 A1 | 4/2007 | Brugiolo | |
| 2007/0199058 A1 | 8/2007 | Baumgart et al. | |
| 2011/0167474 A1 | 7/2011 | Sinha | |
| 2012/0198440 A1* | 8/2012 | Shah | G06F 9/45558 718/1 |
| 2013/0185474 A1* | 7/2013 | Ge | G06F 9/45558 711/6 |

FOREIGN PATENT DOCUMENTS

| | | |
|---|---|---|
| WO | 02/084459 | 10/2002 |
| WO | 20031017068 | 2/2003 |
| WO | 2005066786 | 7/2005 |

OTHER PUBLICATIONS

Nan Li and Yiming Li "A Study of Inter-domain Communication Mechanism on Xen-based Hosting Platforms", Course Project, CS 270: Advanced Topics in Operating Systems, pp. 1-10.

Paravirtualizatio—Wikipedia the free encyclopedia, 3 sheets [retrieved on Nov. 4, 2013], retrieved from the internet: http://en.wikipedia.org/wiki/Paravirtualization.

Xen—Wikipedia the free encyclopedia, 9 sheets [retrieved on Nov. 5, 2013], retrieved from the internet: http://en.wikipedia.org/wiki/Xen.

Xen, how does Xen work? Dec. 2009, Version 1.0, pp. 1-10.

VMware White Paper "Understanding Full Virtualization, Paravirtualization, and Hardware Assist", Nov. 10, 2007, 17 sheets.

* cited by examiner

INTER-VIRTUAL MACHINE COMMUNICATION USING PSEUDO DEVICES

BACKGROUND OF THE INVENTION

1. Field of the Invention

The present invention relates generally to virtual machines, and more particularly to communication between virtual machines.

2. Description of the Background Art

Virtual machines in the art of computer science, in general, are well known. Briefly, a virtual machine is a software implementation of computer hardware and executes programs like a physical machine. Virtualization allows several virtual machines to run on the same computer hardware. Each virtual machine is, in essence, a separate computer (albeit a virtual one) that has its own operating system, file system, and application programs that are separate from other virtual machines running on the same computer hardware. Because each virtual machine is essentially a separate computing environment, conventional inter-process communication techniques are not readily applicable to communications between different software components running on different virtual machines.

SUMMARY

In one embodiment, communication between software components in different virtual machines may be made through a hypervisor between pseudo-devices that have no corresponding physical device. A software component in a virtual machine transfers data to a pseudo-device in the virtual machine. The pseudo-device is connected to another pseudo-device in another virtual machine, and the connection is through the hypervisor. The data from the software component is transferred from the pseudo-device to the other pseudo-device over the connection through the hypervisor. The other pseudo-device in the other virtual machine receives the data and provides the data to another software component in the other virtual machine.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
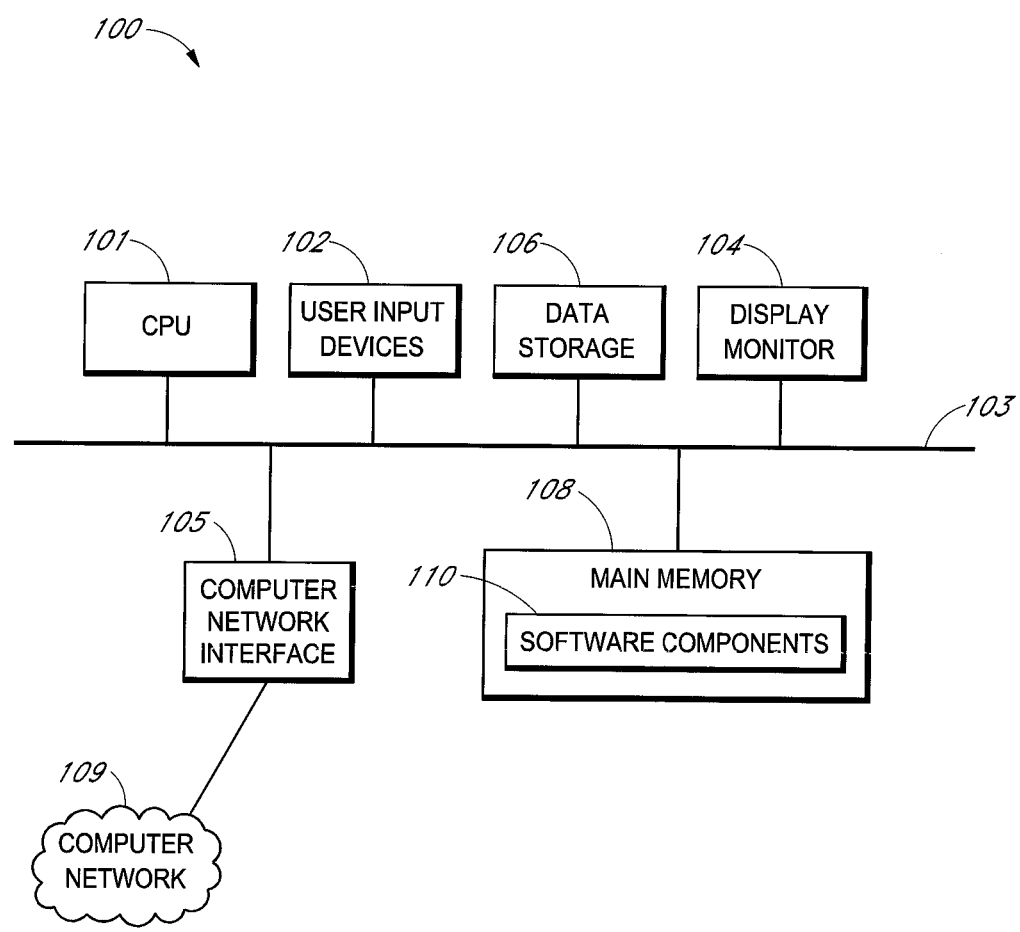
FIG. 1 shows a schematic diagram of a computer in accordance with an embodiment of the present invention.

FIG. 1 shows a schematic diagram of a computer 100 in accordance with an embodiment of the present invention. The computer 100 may be part of a computer system comprising one or more computers hosting a plurality of virtual machines. The computer 100 may have fewer or more components to meet the needs of a particular application. The computer may include one or more central processing units (CPUs) 101. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109.

The computer 100 is a particular machine as programmed with software components 110. The software components 110 comprise computer-readable program code stored non-transitory in the main memory 108 for execution by a processor 101. The software components 110 may be loaded from the data storage device 106 to the main memory 108. The software components 110 may also be made available in other computer-readable medium including optical disk, flash drive, and other memory device.

Figure 2:
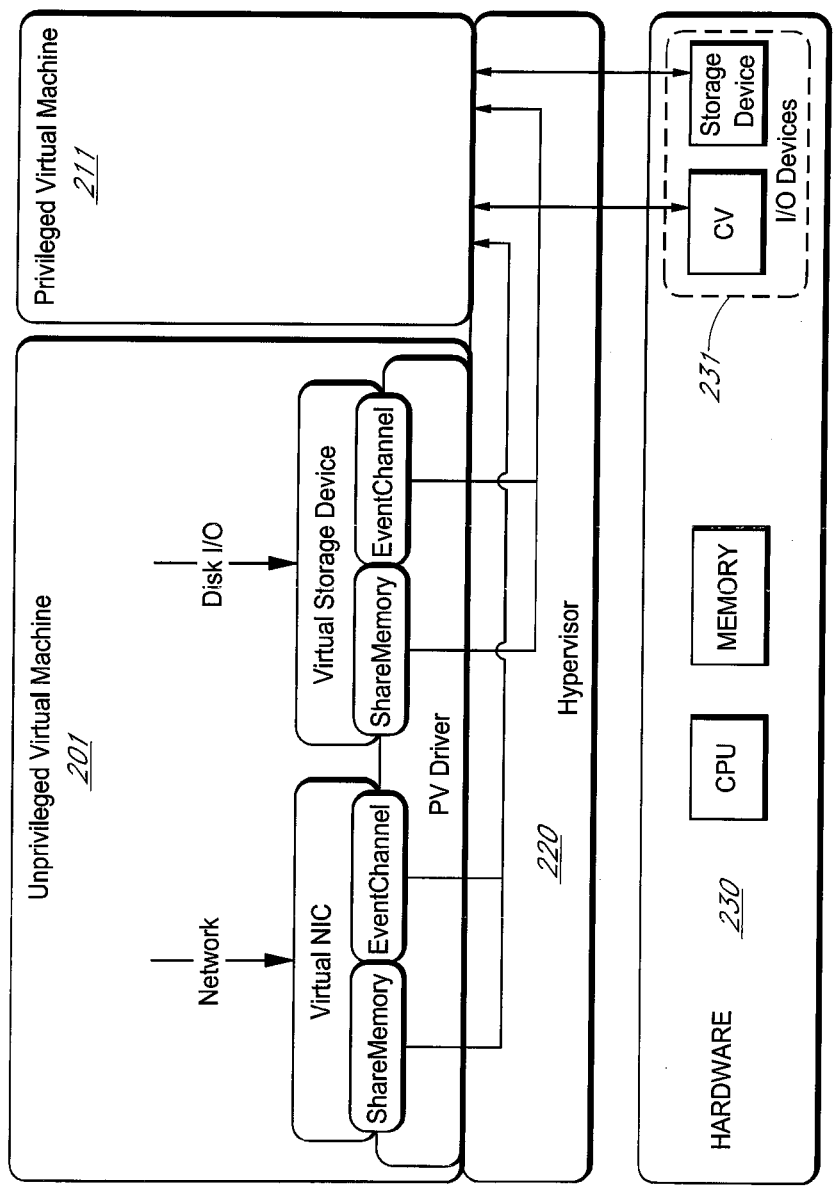
FIG. 2 shows a conventional computer system that hosts a hypervisor that runs a plurality of virtual machines.

FIG. 2 shows a conventional computer system that hosts a hypervisor running a plurality of virtual machines, two of which are labeled as an unprivileged virtual machine 201 and a privileged virtual machine 211. The computer system of FIG. 2 implements virtualization in accordance with a so-called "hypervisor architecture." Accordingly, the virtual machines 201 and 211 run on top of a hypervisor 220, which in turn runs directly on computer hardware 230. The computer hardware 230 includes a CPU, main memory (e.g., RAM), input/output (I/O) devices 231, and other hardware components. The hypervisor 220 abstracts the computer hardware 230 for the virtual machines, and controls the execution of the virtual machines.

The hypervisor 220 is a so-called "bare-metal," i.e., native, hypervisor, such as the XEN hypervisor. Generally speaking, the hypervisor 220 provides CPU scheduling and memory partitioning for the virtual machines. However, the hypervisor 220 has no control of and cannot access the I/O devices 231, which in this example includes a network interface card (NIC) and one or more storage devices. In the hypervisor architecture of FIG. 2, only the privileged virtual machine 211 has direct access to the I/O devices 231. More specifically, the hypervisor 220 and the unprivileged virtual machine 201 cannot directly access the I/O devices 231. An I/O communication path through the hypervisor 220, and comprising shared memory and an event channel, is provided between the unprivileged virtual machine 201 and the privileged virtual machine 211 to allow the unprivileged virtual machine 201 to perform I/O operations, e.g., to transmit data over a computer network or access a storage device, by way of the privilege virtual machine 211. The unprivileged virtual machine 201 may communicate with the privilege virtual machine 211 over the I/O communication path to perform operations with the I/O devices 231 using a para-virtualization driver. This I/O communication path through the hypervisor 220 is only available between the unprivileged virtual machine 201 and the privileged virtual machine 211 for I/O operations with physical I/O devices. It is to be noted that "through the hypervisor" means that the I/O communication path only goes through the hypervisor and no other path outside the hypervisor.

Figure 3:
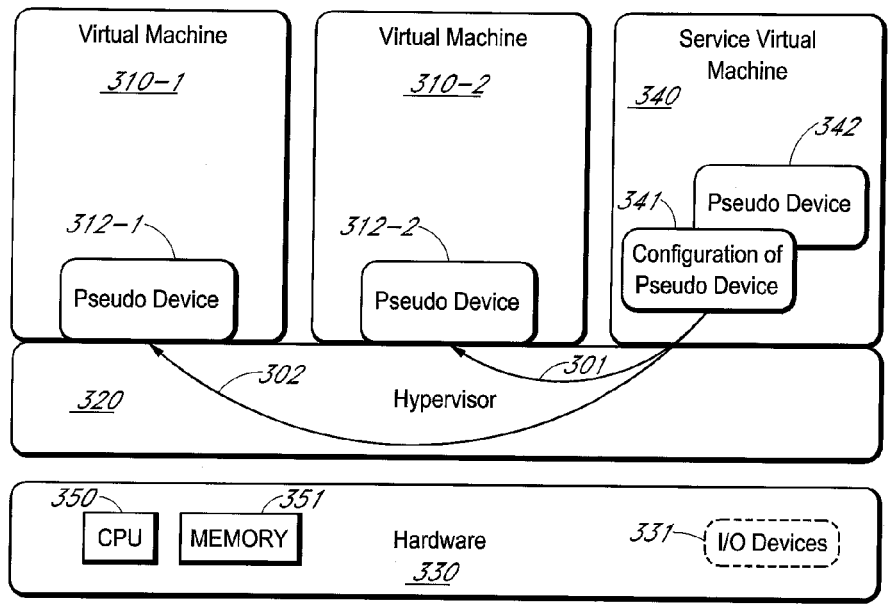
FIG. 3 shows a schematic diagram of a computer system in accordance with an embodiment of the present invention.

FIG. 3 shows a schematic diagram of a computer system in accordance with an embodiment of the present invention. In the example of FIG. 3, the computer system includes hardware components 330, which comprise one or more CPUs 350, main memory 351, I/O devices 331, and other hardware, i.e., physical as opposed to virtual, components. The I/O devices 331 may comprise a network interface card, data storage devices, and other physical I/O devices. The hypervisor 320 and the virtual machines 310 (i.e., 310-1, 310-2, etc.) and 340 may comprise software stored in the main memory 351 and executed by the one or more CPUs 350.

The hypervisor 320, which is also known as a "virtual machine monitor," may comprise a publicly-available hypervisor, such as the XEN hypervisor, for example. Generally speaking, the hypervisor 320 runs a plurality of virtual machines on a host machine, which in this example comprises the hardware components 330. The hypervisor 320 abstracts the hardware components 330 for the virtual machines and controls execution of the virtual machines. In particular, the hypervisor 320 provides CPU scheduling and memory partitioning for the virtual machines. However, like similar native hypervisors or virtual machine monitors, the hypervisor 320 has no control of and cannot directly access the I/O devices 331.

In the example of FIG. 3, the virtual machines 310 comprise unprivileged virtual machines and the service virtual machine 340 comprises a privileged virtual machine. For example, in an XEN hypervisor, the service virtual machine 340 may comprise a Domain 0 virtual machine and an unprivileged virtual machine 310 may comprise a Domain U virtual machine. The service virtual machine 340 is "privileged" in that it has privileged access rights to directly access physical I/O devices. The virtual machines 310, being "unprivileged", cannot directly access physical I/O devices; they may only access physical I/O devices through the service virtual machine 340. In the example of FIG. 3, the service virtual machine 340 may communicate with the virtual machines 310 over an I/O communication path comprising shared memory and an event channel through the hypervisor 320. In one embodiment, the shared memory is only shared between connected virtual machines.

In one embodiment, to establish connection to a virtual machine 310, the service virtual machine 340 makes available a configuration 341 of a pseudo-device 342 in the service virtual machine 340. In one embodiment, a pseudo-device runs in a guest operating system of a virtual machine and serves as a connection port to another virtual machine. As its name implies, a pseudo-device is a fake device. In one embodiment, a pseudo-device is a virtual device that has no corresponding physical device. That is, unlike a virtual device, which is ultimately mapped to a physical device, a pseudo-device is not an abstraction of a physical device. In one embodiment, a pseudo-device is used solely for communication between software components that run in different virtual machines. The hardware components 330 are not shown in subsequent figures involving pseudo-devices because the pseudo-devices do not have corresponding I/O devices 331.

Figure 4:
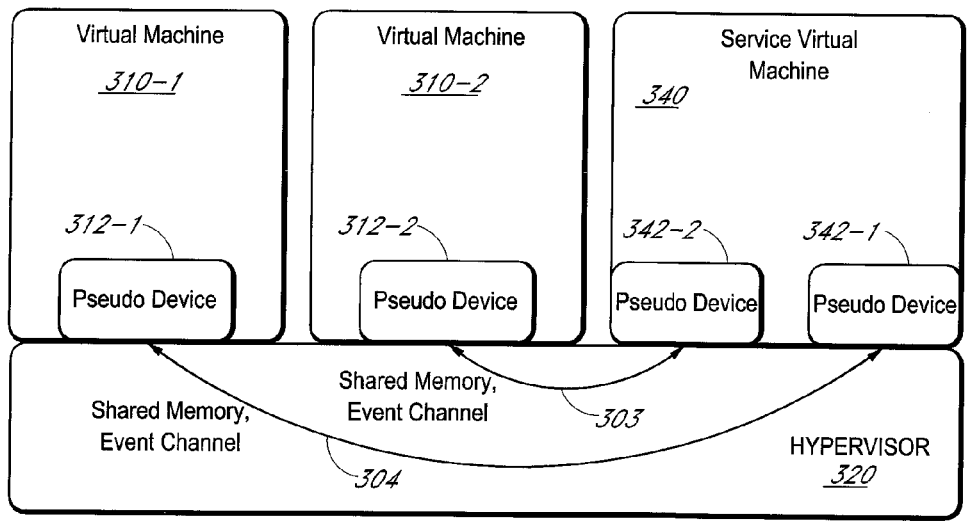
FIG. 4 shows a schematic diagram that illustrates providing a configuration of a pseudo-device to other virtual machines in accordance with an embodiment of the present invention.

The configuration 341 allows the hypervisor 320 to build pseudo-device instances for virtual machines. The service virtual machine 340 may be booted (i.e., started up) before any other virtual machine, making the configuration 341 of the pseudo-device 342 available to other virtual machines upon their boot up. In the example of FIG. 3, the virtual machines 310 are booted up after the service virtual machine 340, and detect the configuration 341 of the pseudo-device 342 (see arrows 301 and 302). In response to detecting the configuration 341 of the pseudo-device 342, each of the virtual machines 310 creates a pseudo-device 312 with separate connections to a pseudo-device 342 in the service virtual machine 340. This is schematically illustrated in FIG. 4 where the virtual machine 310-2 creates a pseudo-device 312-2 that connects to a pseudo-device 342-2 (see arrow 303) and the virtual machine 310-1 creates a pseudo-device 312-1 that connects to a pseudo-device 342-1 (see arrow 304). The pseudo-devices 312 and 342 may be connected as driver domain features. During creation of a pseudo-device, its driver domain is assigned in device configuration. The pseudo-device represents a connection endpoint to the other pseudo-device it is connected.

In one embodiment, the connection between pseudo-devices is an I/O communication path through the hypervisor 320, and comprising a shared memory and an event channel. The shared memory may comprise memory locations that are accessible to both virtual machines. An event channel provides a tunnel for notifying a pseudo-device of an event in the I/O communication path, including availability of data in the shared memory. For example, the pseudo-device 312-2 may store data in the shared memory shared by the virtual machine 310-1 and the service virtual machine 340, and alert the pseudo-device 342-2 of the availability of the data in the shared memory by sending a signal over the event channel. In one embodiment, the connection between pseudo-devices comprises para-virtualization device drivers, such as those provided in the XEN hypervisor.

Figure 5:
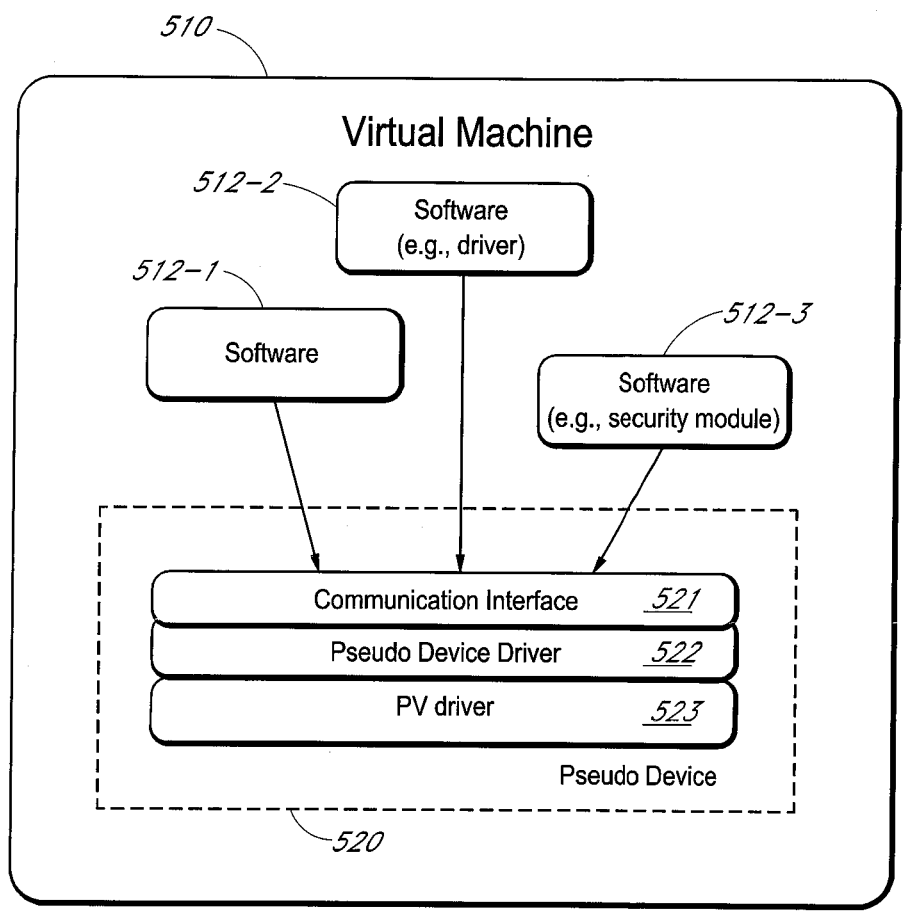
FIG. 5 schematically shows a virtual machine in accordance with an embodiment of the present invention.

FIG. 5 schematically shows a virtual machine 510 in accordance with an embodiment of the present invention. The virtual machine 510 may be an embodiment of a virtual machine 310, a service virtual machine 340, or some other virtual machine run by the hypervisor 320. The pseudo-device 520 may be an embodiment of pseudo-device 312, 342, or some other pseudo-device in a virtual machine run by the hypervisor 220. In the example of FIG. 5, the pseudo-device 520 comprises a para-virtualization driver 523, a pseudo-device driver 522, and a communication interface 521.

In one embodiment, the para-virtualization driver 523 comprises a para-virtualization driver of the XEN hypervisor or some other publicly available virtual machine monitor. The para-virtualization driver 523 allows for communication between two virtual machines through the hypervisor 320. More specifically, a para-virtualization driver 523 allows for communication between a pseudo-device 310 of a virtual machine and a pseudo-device 340 of a service virtual machine through the hypervisor 320. Although para-virtualization drivers are typically employed for I/O operations to physical I/O devices, embodiments of the present invention may employ para-virtualization drivers to establish a connection between a software component in one virtual machine to another software component in another virtual machine, the connection being through the hypervisor 320.

In one embodiment, the pseudo-device driver 522 is implemented as a child device in the para-virtualization driver 523. The para-virtualization driver 523 serves as a bus driver in the virtual machine 510 and the pseudo-device 520 operates on that bus. The pseudo-device driver 522 may be implemented as a wrapper of the para-virtualization driver 523 to provide a communications interface 521 for receiving event channel and shared memory communications from software components 512 (i.e., 512-1, 512-2, 512-3, etc.) and relaying the communications to the para-virtualization driver 523. The para-virtualization driver 523 connects to and provides the event channel and shared memory communications to another para-virtualization driver in another virtual machine.

Figure 6:
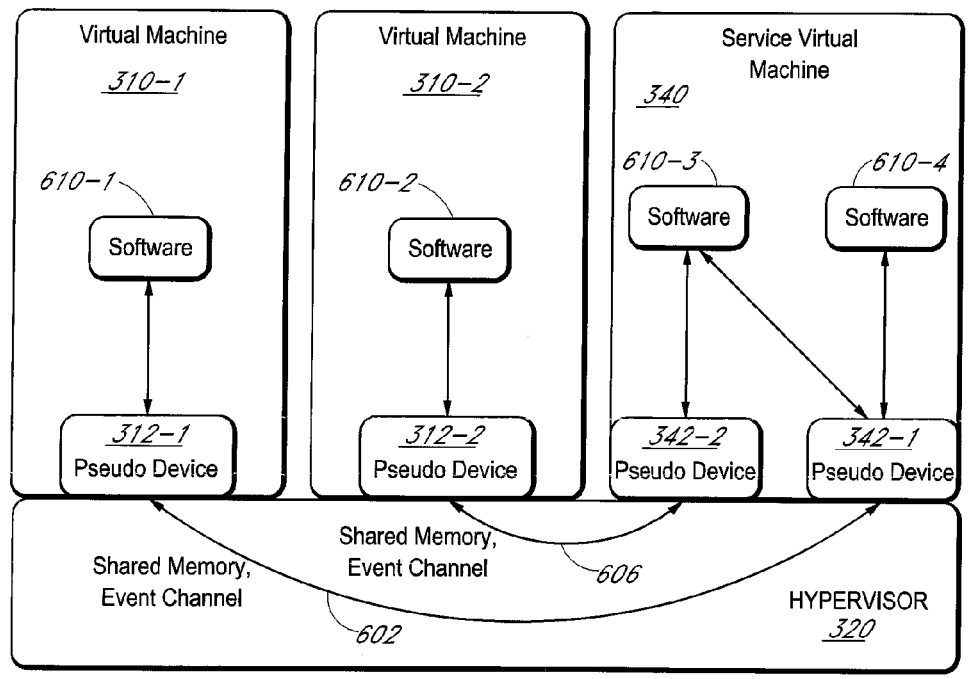
FIG. 6 schematically shows inter-virtual machine communication between software components in accordance with an embodiment of the present invention.

FIG. 6 schematically shows inter-virtual machine communications between software components in accordance with an embodiment of the present invention. In the example of FIG. 6, a software component 610 (i.e., 610-1, 610-2, 610-3, 610-4) comprises a piece of software, such as an application program, a driver, a security module, or other piece of software. In the example of FIG. 6, the software component 610-1 running in the virtual machine 310-1 communicates with the software component 610-4 running in the service virtual machine 340 through the hypervisor 320 over a connection 602 established between the pseudo-device 312-1 in the virtual machine 310-1 and a pseudo-device 342-1 in the service virtual machine 340. As explained with reference to FIG. 5, a pseudo-device, such as the pseudo-device 312-1 and the pseudo-device 342-1, may include a para-virtualization driver for creating a connection between virtual machines through the hypervisor 320.

The software component 610-1 may, e.g., by way of the pseudo-device 312-1, store data in a shared memory shared by the virtual machine 310-1 and the service virtual machine 340, and send a signal over the event channel of the connection 602 indicating availability of the data in the shared memory. The pseudo-device 342-1 may receive the signal over the event channel of the connection 602, respond to the signal by retrieving the data from the shared memory, parse the data to determine that the data is for the software component 610-4, and forward the data to the software component 610-4. The software component 610-4 or the software component 610-3 may send data to the software component 610-1 in a similar manner in the other direction. Inter-virtual machine communication between the software component 610-2 in the virtual machine 310-2 and the software component 610-3 may also be performed over a connection 606 established between the pseudo-device 312-2 and the pseudo-device 342-2 through the hypervisor 320. In general, inter-virtual machine communication between software components may be established through the hypervisor by creating a pseudo-device in each of the virtual machines where the corresponding software component is running and establishing a connection between pseudo-devices.

Figure 7:
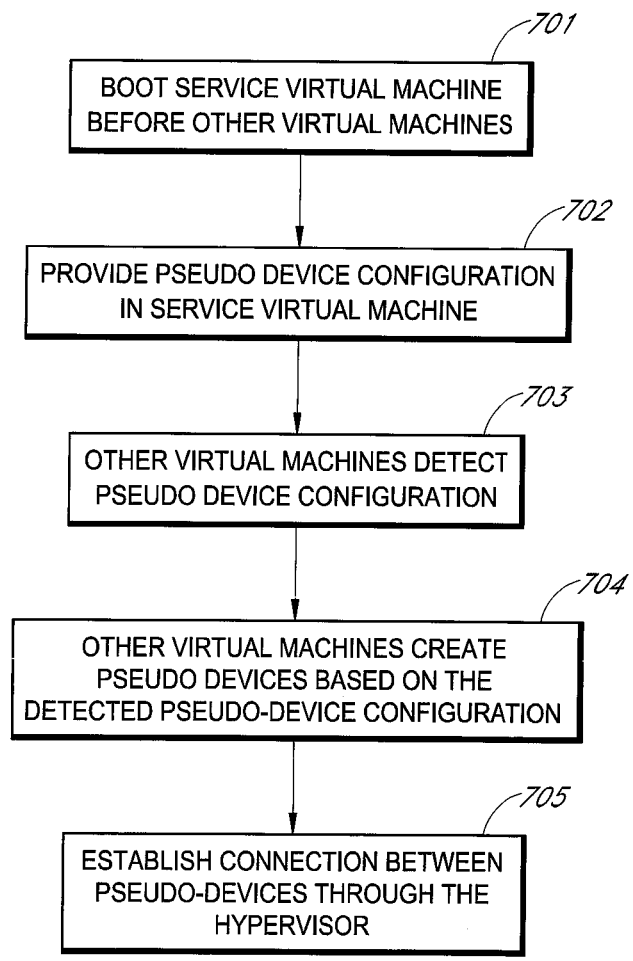
FIG. 7 shows a flow diagram of a computer-implemented method of establishing a communication path between software components running in different virtual machines in accordance with an embodiment of the present invention.

FIG. 7 shows a flow diagram of a computer-implemented method of establishing a communication path between software components running in different virtual machines in accordance with an embodiment of the present invention. The method of FIG. 7 may be performed by a computer system that comprises one or more computers that host a hypervisor that runs a plurality of virtual machines.

In the example of FIG. 7, the computer system boots a first virtual machine before any other virtual machines that are running under a native hypervisor (step 701). The first virtual machine may comprise a privileged virtual machine, such as a service virtual machine. The first virtual machine provides a configuration of a first pseudo-device upon boot up (step 702). Other virtual machines run by the hypervisor, such as unprivileged virtual machines, are booted up and detect the configuration of the first pseudo-device in the first virtual machine (step 703). The other virtual machines create and run a pseudo-device in accordance with the configuration of the first pseudo-device in the first virtual machine (step 704). A connection between the first pseudo-device in the first virtual machine and a pseudo-device in another virtual machine is created through the hypervisor (step 705). Thereafter, a software component in the first virtual machine and another component in another virtual machine may communicate by sending data over a connection established between the first pseudo-device in the first virtual machine and another pseudo-device in the other virtual machine.

Figure 8:
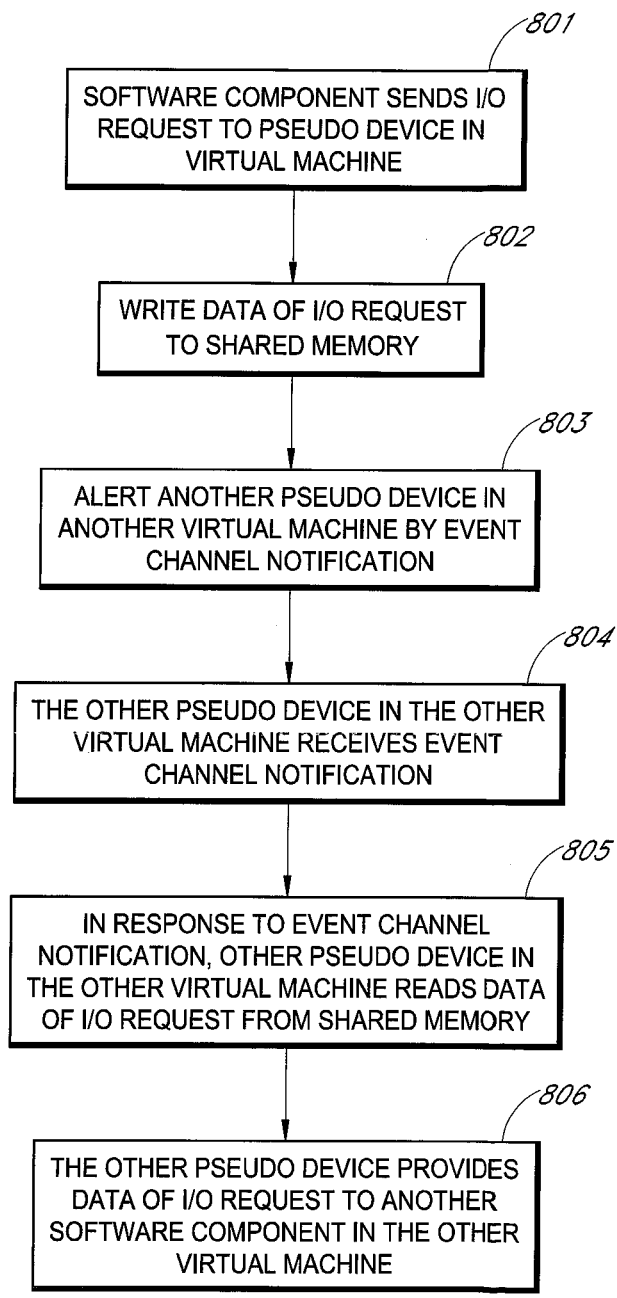
FIG. 8 shows a flow diagram of a computer-implemented method of transferring data from a software component in one virtual machine to another software component in another virtual machine in accordance with an embodiment of the present invention.

FIG. 8 shows a flow diagram of a computer-implemented method of transferring data from a second software component in a second virtual machine to a first software component in a first virtual machine in accordance with an embodiment of the present invention. The method of FIG. 8 may be performed by the computer system that performed the method of FIG. 7, and the second software component in the second virtual machine may communicate with the first software component in the first virtual machine over the connection established between the first pseudo-device in the first virtual machine and a second pseudo-device in the second virtual machine through the hypervisor as explained in the method of FIG. 7. The second virtual machine may be an unprivileged virtual machine and the first virtual machine may be a privileged virtual machine, such as a service virtual machine.

In the example of FIG. 8, the second software component in the second virtual machine sends an I/O request to the second pseudo-device in the second virtual machine (step 801). The I/O request may include data to be transferred to the first software component in the first virtual machine. The data may include an identifier that identifies the first software component as the recipient of the data. For example, the data may include a field for addressing the data to the first software component. As can be appreciated, because the pseudo-devices have no corresponding physical device, the first software component (and not a physical device) is the intended final destination of the data. The second pseudo-device in the second virtual machine receives the I/O request and the data to be transferred, writes the data to the shared memory shared by the second virtual machine and the first virtual machine (step 802), and sends a signal over the event channel between the second pseudo-device and the first pseudo-device indicating availability of the data in the shared memory (step 803). The first pseudo-device in the first virtual machine receives the notification over the event channel (step 804) and, in response, reads the data in the shared memory (step 805). The first pseudo-device provides the data read from the shared memory to the first software component in the first virtual machine (step 806).

Methods and systems for inter-virtual machine communication have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of communicating between software components of virtual machines, the method comprising:
    a hypervisor running a plurality of virtual machines;
    a first virtual machine of the plurality of virtual machines detecting a configuration of a second pseudo-device in a second virtual machine of the plurality of virtual machines and, in response to detecting the configuration of the second pseudo-device, creating a first pseudo-device based on the configuration of the second pseudo-device, wherein the second virtual machine is a privileged virtual machine and the first virtual machine is an unprivileged virtual machine;
    a first software component in the first virtual machine sending data to the first pseudo-device in the first virtual machine;
    the first pseudo-device establishing a dedicated connection to the second pseudo-device of the second virtual machine through the hypervisor, and placing the data in a shared memory shared by the first virtual machine and the second virtual machine, wherein the first and second pseudo-devices comprise virtual devices with no corresponding physical device;
    alerting the second pseudo-device to presence of the data in the shared memory by way of a signal received through the hypervisor; and
    in response to the alerting, the second pseudo-device retrieving the data from the shared memory and providing the data to a second software component in the second virtual machine.

2. The computer-implemented method of claim 1, wherein the data is addressed to the second software component.

3. The computer-implemented method of claim 1, wherein the data is provided by the first software component to the first pseudo-device by way of an input/output (I/O) request from the first software component to the first pseudo-device.

4. The computer-implemented method of claim 1, wherein the second software component comprises a security module.

5. The computer-implemented method of claim 1, wherein the first virtual machine connects to the second virtual machine by way of a para-virtualization driver.

6. A system comprising:
    a memory; and
    a processor that executes instructions in the memory to
    host a hypervisor running a plurality of virtual machines,
    boot a first virtual machine of the plurality of virtual machines and a second virtual machine of the plurality of virtual machines, wherein the first virtual machine is an unprivileged virtual machine and the second virtual machine is a privileged virtual machine,
    create a first pseudo-device in the first virtual machine based on a detected configuration of a second pseudo-device in the second virtual machine,
    establish a dedicated connection from the first pseudo-device in the first virtual machine to the second pseudo-device in the second virtual machine through the hypervisor, and
    transfer data from a first software component in the first virtual machine to a second software component in the second virtual machine over the dedicated connection through the hypervisor, wherein the first and second pseudo-devices comprise virtual devices that have no corresponding physical device,
    wherein the data is transferred over a shared memory shared by the first and second virtual machines,
    wherein the second software component is alerted of availability of the data in the shared memory by way of a signal transmitted through the hypervisor, and
    wherein the data is retrieved by the second pseudo-device from the shared memory and is provided by the second pseudo-device to the second software component in the second virtual machine.

7. The system of claim 6, wherein the first virtual machine is connected to the second virtual machine by way of a para-virtualization driver.

8. A computer-implemented method comprising:
    running a plurality of virtual machines that include a first virtual machine and a second virtual machine;
    providing a configuration of a second pseudo-device in the second virtual machine;
    creating a first pseudo-device in the first virtual machine based on the configuration of the second pseudo-device, wherein the first virtual machine is an unprivileged virtual machine and the second virtual machine is a privileged virtual machine;
    establishing a dedicated connection between the first pseudo-device of the first virtual machine and the second pseudo-device of the second virtual machine through a hypervisor that runs the plurality of virtual machines; and
    transferring data from a first software component in the first virtual machine to a second software component in the second virtual machine over the connection between the first pseudo-device and the second pseudo-device through the hypervisor,
    wherein the first pseudo-device and the second pseudo-device comprise virtual devices that have no corresponding physical device, and transferring the data from the first software component in the first virtual machine to the second software component in the second virtual machine comprises:
        storing the data in a shared memory shared by the first virtual machine and the second virtual machine;
        alerting the second pseudo-device of availability of the data in the shared memory by way of a signal transmitted through the hypervisor; and
        in response to the alerting, the second pseudo-device retrieving the data from the shared memory and providing the data to the second software component in the second virtual machine.

9. The computer-implemented method of claim 8, wherein the first pseudo-device and the second pseudo-device are connected through the hypervisor by way of a para-virtualization driver.

10. The computer-implemented method of claim 8, wherein the data is transferred from the first software component to the first pseudo-device by way of an I/O request.

11. The computer-implemented method of claim 8, wherein the data is addressed to the second software component.

* * * * *